(12) United States Patent
Mansour et al.

(10) Patent No.: US 12,593,223 B2
(45) Date of Patent: Mar. 31, 2026

(54) RESOURCE OPTIMIZATION FOR VOICE AND DATA SERVICES

(71) Applicant: T-Mobile Innovations LLC, Overland Park, KS (US)

(72) Inventors: Nagi Mansour, Arlington, VA (US); Akin Ozozlu, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 383 days.

(21) Appl. No.: 18/338,701

(22) Filed: Jun. 21, 2023

(65) Prior Publication Data

US 2024/0430705 A1     Dec. 26, 2024

(51) Int. Cl.
*H04W 24/02* (2009.01)
*H04W 24/08* (2009.01)
*H04W 28/16* (2009.01)
*H04W 72/04* (2023.01)

(52) U.S. Cl.
CPC ........... *H04W 24/02* (2013.01); *H04W 24/08* (2013.01); *H04W 28/16* (2013.01); *H04W 72/04* (2013.01)

(58) Field of Classification Search
None
See application file for complete search history.

(56) References Cited

U.S. PATENT DOCUMENTS

| | | |
|---|---|---|
| 2022/0159522 A1 | 5/2022 | Cui et al. |
| 2022/0159525 A1 | 5/2022 | Chou et al. |
| 2022/0248488 A1* | 8/2022 | Sen ........................ H04W 76/34 |

* cited by examiner

*Primary Examiner* — Peter P Chau
(74) *Attorney, Agent, or Firm* — Jones Burke, PLLC

(57)     ABSTRACT

Systems, methods and computer-readable mediums are provided for resource monitoring and optimization within a network. Monitoring network resource usage can be based on time of day, cell loading conditions, wireless device location, and cell size. Through the monitoring, methods include determining proportions of the network resources utilized by the wireless devices within the network for voice over new radio (VoNR), voice over LTE (VoLTE) and data services during the monitoring. Based on this determination, methods provided herein reallocate the network resources based on the monitored resource usage and the proportions.

20 Claims, 6 Drawing Sheets

400

MONITOR RESOURCE USAGE
410

STORE LEARNED PATTERNS
420

DYNAMICALLY ALLOCATE RESOURCES BASED ON LEARNED PATTERNS
430

300

301 — NETWORK

310

306

320

330

312

313

314

315

316        318

ACCESS NODE

PROCESSOR

RESOURCE
MANAGEMENT
PROCESSOR

MEMORY

TX / RX

ANTENNA

SCHEDULER

RESOURCE OPTIMIZATION FOR VOICE AND DATA SERVICES

TECHNICAL BACKGROUND

A wireless network, such as a cellular network, can include an access node (e.g., base station) serving multiple wireless devices or user equipment (UE) in a geographical area covered by a radio frequency transmission provided by the access node. Access nodes may deploy different carriers within the cellular network utilizing different types of radio access technologies (RATs). RATs can include, for example, 3G RATs (e.g., GSM, CDMA etc.), 4G RATs (e.g., WiMax, long term evolution (LTE), etc.), and 5G RATs (new radio (NR)). Further, different types of access nodes may be implemented for deployment for the various RATs. For example, an evolved NodeB (eNodeB or eNB) may be utilized for 4G RATs and a next generation NodeB (gNodeB or gNB) may be utilized for 5G RATs. Deployment of the evolving RATs in a network provides numerous benefits. For example, newer RATs may provide additional resources to subscribers, faster communications speeds, and other advantages. For example, 5G networks provide edge deployments enabling computing capabilities closer to UEs.

With respect to voice calling technologies, voice over LTE (VoLTE) has become prevalent in both 4G networks and hybrid networks utilizing 4G and 5G RATs. VoLTE is an LTE high-speed wireless communication standard for mobile phones and data terminals, including Internet of things (IoT) devices and wearables. VoLTE has several times more voice and data capacity than older technologies. Further, it uses less bandwidth than previous technologies.

Voice over new radio (VoNR) has evolved as a 5G high-speed wireless communication standard for mobile phones and data terminals, including Internet of things (IoT) devices and wearables. VoNR fully utilizes the 5G Standalone (SA) core and can have better voice quality than its predecessor VoLTE. An advantage of VoNR over VoLTE is faster call setup time due to the inherent lower latency of 5G NR. However, due to the prevalence and extensive use and development of VoLTE, and the limited capabilities of existing wireless devices, challenges exist in developing VoNR to provide a customer experience that equals or surpasses that provided by VoLTE.

With current efforts underway to increase the infrastructure for the 5GSA, efforts to improve the VoNR customer experience have become more critical. Accordingly, solutions are needed for ensuring sufficient resources exist within a network for VoNR, while maintaining VoLTE quality of service (QoS) and data transmission capabilities.

Overview

Exemplary embodiments described herein include systems, methods, and processing nodes for optimizing the wireless device experience through adaptive resource allocation, when utilizing VoNR, VoLTE, and data transmission. A method includes monitoring traffic over time within a network to assess the use of VoLTE, VoNR, and data transmission services. Specifically, in embodiments provided herein, methods are provided that include monitoring network resource usage by wireless devices within a network based on time of day, cell loading conditions, wireless device location, and cell size. The method further includes determining proportions of the network resources utilized by the wireless devices within the network for voice over new radio (VoNR), voice over LTE (VoLTE) and data services during the monitoring. The method additionally includes reallocating the network resources based on the monitored resource usage and the proportions.

An additional exemplary embodiment includes a resource optimization system. The resource optimization system includes a memory storing instructions and a processor executing the stored instructions to perform multiple operations. The operations include monitoring resource usage by wireless devices within a network based on time of day, cell loading conditions, wireless device location, and cell size. The operations further include determining proportions of resources utilized by the wireless devices within the network for voice over new radio (VoNR), voice over LTE (VoLTE) and data services during the monitoring and reallocating the network resources based on the monitored resource usage and the proportions.

Additional exemplary embodiments include processing nodes performing the operations described above. Further embodiments include non-transitory computer-readable mediums storing instructions, that when executed by a processor, perform the steps and operations identified above.

DETAILED DESCRIPTION

Figure 1:
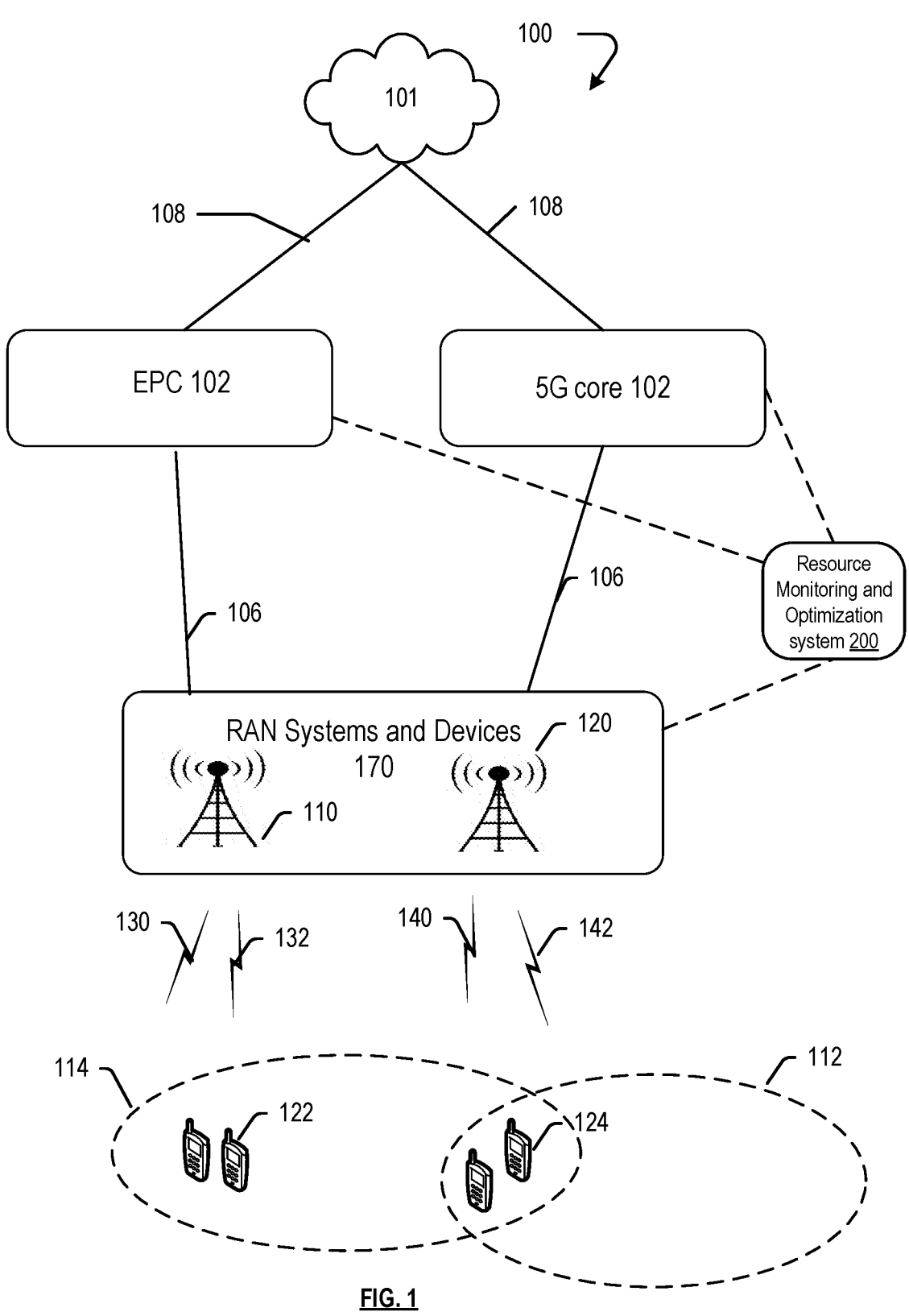
FIG. 1 depicts an exemplary operating environment system for resource optimization in accordance with the disclosed embodiments.

Exemplary embodiments described herein include systems, methods, and devices for optimizing the wireless device experience through adaptive or dynamic resource allocation and load balancing to ensure QoS when VoNR, VoLTE and data transmission are being utilized. Further, the dynamic resource allocation ensures that resource usage will be balanced, rather than having some resources underutilized and other resources overutilized.

A method includes monitoring resource utilization over time in multiple locations within multiple cells for wireless devices utilizing a network offering VoLTE, VoNR, and data transmission. Based on the monitored resource utilization, the method re-balances resources and/or load strategically in order to guarantee quality of service (QoS) during VoNR and VoLTE.

VoLTE and VoNR allow voice calls to be made over 4G LTE and 5GNR networks respectively. VoLTE is defined by LTE and further is prevalent in the 5GNSA scenario. VoNR is defined by 5G and is provided in the 5GNRSA scenario. Accordingly, because VoLTE is based on 4G and VoNR is based on 5G, multiple differences exist between the two. VoNR is designed to provide ultra-low latency, which is critical for certain use cases such as gaming and industrial automation. Further, VoNR provides better voice quality and faster call setup times than VoLTE. Additionally, while VoLTE utilizes an EPC (Evolved Packet Core), VoNR utilizes a 5GC (5G core).

While VoNR can provide higher data transmission rates and greater network efficiency, multiple challenges have been linked to the deployment of VoNR technology. Ensuring a consistent level of quality in 5G networks can be difficult, because network conditions can vary greatly based on location and number of users. Further, VoNR is not available everywhere because 5G networks are not as prevalent as 4G networks. Under VoNR, wireless devices reside in the 5G network, and both voice and data are carried in 5G. In poor-coverage areas of 5G signal, 5G to 4G or VoNR to VoLTE handovers can be executed. Further, not all devices are 5G capable and some devices will therefore be unable to connect to VoNR. Thus, the addition of VoNR makes ensuring a consistent level of voice quality more difficult.

Within each cell, usage of VoLTE, VoNR, and data service may vary based on time of day, the loading characteristics of the cell, location within a cell, and the size of the cell. For example, data transmission may occupy a larger portion of resources in most cells during peak daytime hours, whereas voice services, such as VoLTE, and VoNR usage may peak during evening hours. Further, some cells may be more heavily loaded than others. As an additional consideration, wireless devices at a cell edge (further from the access node and close to a coverage area boundary) may have a more difficult time obtaining a satisfactory QoS during voice calls than during data transmission. Additionally, larger cells may experience different resource usage patterns than smaller cells. Thus, the proportion of resources utilized for VoNR, VoLTE, and data transmission is dependent on location in a cell, time of day, cell load, and cell size.

Accordingly, embodiments provided herein allow flexible and dynamic allocation of network resources based on these factors. With the evolution of 5GSA networks, the networks are able to provide both VoNR and VoLTE, whereas previous networks defaulted all voice calls to VoLTE. Both types of voice calls require a higher QoS than data transmission.

Thus, embodiments provided herein monitor wireless device activity and resource usage in the network over a time period. For example, monitoring could occur over a week or a month to assess resource usage patterns. Based on the resource usage patterns, systems and methods provided herein apply a balancing algorithm in order to balance load and allocate resources based on historical patterns in order to improve the wireless device experience.

In addition to the systems and methods described herein, the operations for resource allocation based on load may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system 100 for wireless communication, in accordance with the disclosed embodiments. The system 100 may include a communication network 101, core networks 102 and 103, and a radio access network (RAN) 170 including at two access nodes 110, 120. The RAN 170 may include other devices and additional access nodes. The system 100 also includes multiple wireless devices 122, 124 which may be end-user wireless devices and may operate within one or more coverage areas 112, 114 and communicate with the RAN 170 over communication links 130, 132, 140, 142, which may for example be 4G LTE and 5G NR communication links. Communication links 130, 132, 140, 142 may further be distinguished based on whether they are carrying voice transmissions or data transmissions. For example, communication link 130 may carry data from the EPC core 102, communication link 132 may support VoLTE transmissions, communication link 140 may support data transmissions from the 5G core 103, and communication link 142 may support VoNR.

The system 100 may further include a resource monitoring and optimization system 200, which is illustrated as operating between the core networks 102 and 103 and the RAN 170. However, it should be noted that the resource monitoring and optimization system 200 may be distributed. For example, the resource monitoring and optimization system 200 may utilize components located at both the core networks 102, 103 at multiple and at access nodes 110, 120. Alternatively, the resource monitoring and optimization system 200 may be an entirely discrete component operating between the core networks 102, 103 and the RAN 170.

The resource monitoring and optimization system 200 receives information pertaining to resource usage over the transmission links 130, 132, 140, and 142. For example, the resource and optimization system 200 may collect information pertaining to a number of connected devices over each communication link, the number of devices in each coverage area 114, 112 connected over each link, and the locations of the connected devices. The resource monitoring and optimization system 200 analyzes this information for many wireless devices 122, 124 over time to develop a resource allocation plan for cells within the network. The resource allocation plan may involve reallocating resource blocks, adjusting antenna parameters, limiting connectivity over the various communication links, and handing over devices. For example, devices connected to VoNR may be handed over to VoLTE when insufficient resources exist for maintaining quality of service on VoNR. Alternatively, devices near a cell edge using VoLTE may be handed over to a nearby access node utilizing VoNR.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 122, 124. Wireless network protocols can comprise Multimedia Broadcast Multicast Services (MBMS), code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

The core networks 102 and 103 includes core network functions and elements. The core network 102 may have an evolved packet core (EPC) structure and the core network 103 may be structured using a service-based architecture (SBA). As 5G SA networks mature, voice services are carried by 5G with VoNR, for example through the use of IP Multimedia Subsystem (IMS). For wireless devices 124 using VoNR, the wireless devices 124 reside in the 5G network, and both voice and data can be carried using 5G through the communication links 140 and 142. In poor-coverage areas of 5G signal, 4/5G handover-based interoperability can be achieved, and the LTE core network 102 provides voice services. An inter-RAT handover mechanism can allow for handovers between VoNR and VoLTE.

The network functions and elements may be separated into user plane functions and control plane functions for both core networks 102 and 103. In an SBA architecture of the core network 103, service-based interfaces may be utilized between control-plane functions, while user-plane functions connect over point-to-point link. The user plane function (UPF) accesses a data network, such as network 101, and performs operations such as packet routing and forwarding, packet inspection, policy enforcement for the user plane, quality of service (QoS) handling, etc. The control plane functions may include, for example, a network slice selection function (NSSF), a network exposure function (NEF), a network repository function (NRF), a policy control function (PCF), a unified data management (UDM) function, an application function (AF), an access and mobility function (AMF), an authentication server function (AUSF), and a session management function (SMF). Additional or fewer control plane functions may also be included. The AMF receives connection and session related information from the wireless devices 124 and is responsible for handling connection and mobility management tasks. The SMF is primarily responsible for creating updating and removing sessions and managing session context. The UDM function provides services to other core functions, such as the AMF, SMF, and NEF. The UDM function may function as a stateful message store, holding information in local memory. The NSSF can be used by the AMF to assist with the selection of network slice instances that will serve a particular device. Further, the NEF provides a mechanism for securely exposing services and features of the core network.

Communication links 106 and 108 can use various communication media, such as air, space, metal, optical fiber, or some other signal propagation path—including combinations thereof. Communication links 106 and 108 can be wired or wireless and use various communication protocols such as Internet, Internet protocol (IP), local-area network (LAN), Si, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication links 106 and 108 can be direct links or might include various equipment, intermediate components, systems, and networks, such as a cell site router, etc. Communication links 106 and 108 may comprise many different signals sharing the same link. Communication links 106 and 108 may be associated with many different reference points.

The RAN 170 may include various access network systems and devices such as access nodes 110 and 120. The RAN 170 is disposed between the core networks 102 and 103 and the end-user wireless devices 122, 124. Components of the RAN 170 may communicate directly with the core networks 102, 103 and others may communicate directly with the end user wireless devices 122, 124. The RAN 170 may provide services from the core networks 102, 103 to the end-user wireless devices 122, 124.

The RAN 170 includes at least an access node (or base station) 110, such as an eNodeB, and an access node 120, which is a next generation NodeB (gNodeB) 110 communicating with the plurality of end-user wireless devices 122, 124. It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB. The RAN components 170 may include base stations 110, 120 having antennas that cover a specific region, such as coverage areas 112, 114, depending on their capacity. The RAN 170 may further include radio controllers and other components operate on different layers and domains, such as physical, logical, and transport.

Access nodes 110, 120 can be, for example, standard access nodes such as a macro-cell access node, a base transceiver station, a radio base station, an eNodeB device, an enhanced eNodeB device, a next generation NodeB (or gNodeB) in 5G New Radio ("5G NR"), or the like. In additional embodiments, access nodes may comprise two co-located cells, or antenna/transceiver combinations that are mounted on the same structure. Alternatively, access nodes 110, 120 may comprise a short range, low power, small-cell access node such as a microcell access node, a picocell access node, a femtocell access node, or a home eNodeB device. Access nodes 110, 120 can be configured to deploy one or more different carriers, utilizing one or more RATs. For example, a gNodeB may support NR and an eNodeB may provide LTE coverage. Any other combination of access nodes and carriers deployed therefrom may be evident to those having ordinary skill in the art in light of this disclosure.

The access nodes 110, 120 can comprise a processor and associated circuitry to execute or direct the execution of computer-readable instructions to perform operations such as those further described herein. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

The wireless devices 122, 124 may include any wireless device included in a wireless network. For example, the term "wireless device" may include a relay node, which may communicate with an access node. The term "wireless device" may also include an end-user wireless device, which may communicate with the access node 110, 120 in the access network 170 through the relay node. The term "wireless device" may further include an end-user wireless device that communicates with the access node directly without being relayed by a relay node. In embodiments disclosed herein, the wireless devices 122, 124 may report their locations and performance parameters to the access nodes 110, 120

Wireless devices 122, 124, may be any device, system, combination of devices, or other such communication platform capable of communicating wirelessly with access nodes 110, 120 using one or more frequency bands and wireless carriers deployed therefrom. Each of wireless devices 122, 124, may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices 122, 124 may be or include high power wireless devices or standard power wireless devices. Further, some wireless devices may be 5G capable and other wireless devices may not be 5G capable and would therefore not be capable of utilizing VoNR. Other types of communication platforms are possible.

System 100 may further include many components not specifically shown in FIG. 1 including processing nodes, controller nodes, routers, gateways, and physical and/or wireless data links for communicating signals among various network elements. System 100 may include one or more of a local area network, a wide area network, and an internetwork (including the Internet). Communication system 100 may be capable of communicating signals and carrying data, for example, to support voice, push-to-talk, broadcast video, and data communications by end-user wireless devices 122, 124. Wireless network protocols may include one or more of MBMS, code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). System 100 may include additional base stations, controller nodes, telephony switches, internet routers, network gateways, computer systems, communication links, or other type of communication equipment, and combinations thereof.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the access network 170 and the core networks 102, 103.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The operations for facilitating load balancing and resource optimization may be implemented as computer-readable instructions or methods, and processing nodes on the network for executing the instructions or methods. The processing node may include a processor included in the access node or a processor included in any controller node in the wireless network that is coupled to the access node.

Figure 2:
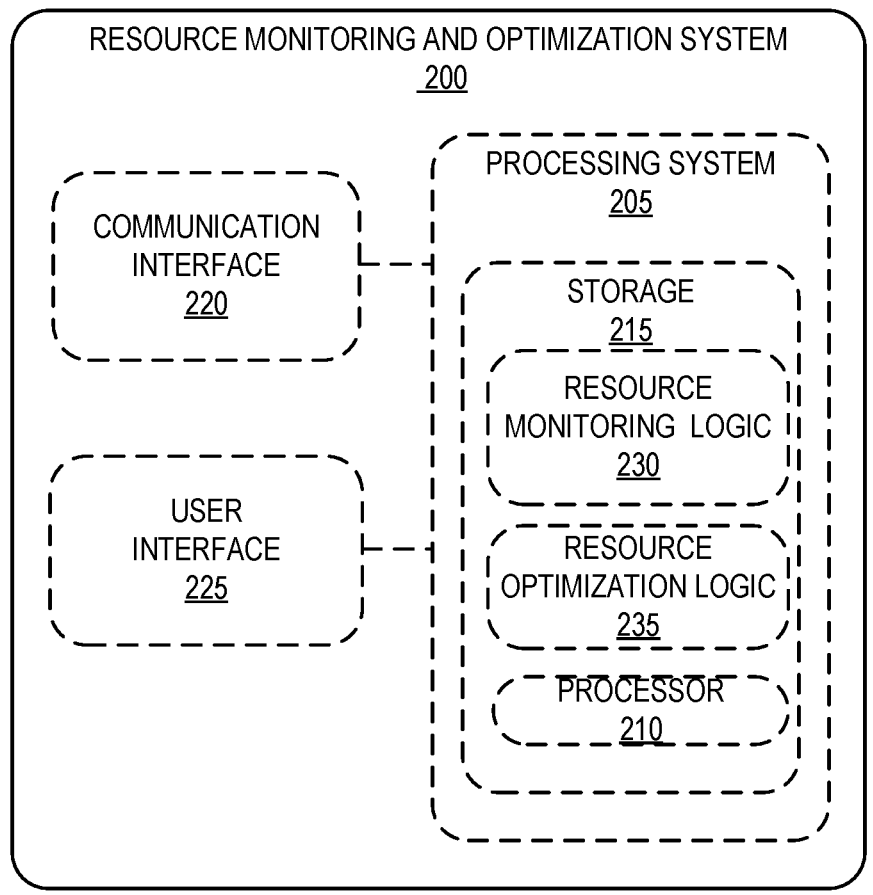
FIG. 2 illustrates an exemplary configuration for a system for resource optimization in accordance with disclosed embodiments.

FIG. 2 depicts an exemplary resource monitoring and optimization system 200, which may be configured to perform load balancing and resource optimization and enhance network performance. In the disclosed embodiments, the resource monitoring and optimization system 200 may be integrated with the access node 110, 120, the core networks 102, 103 or may be an entirely separate component capable of communicating with the access nodes 110, 120, core networks 102, 103 and the wireless devices 122, 124.

The resource monitoring and optimization system 200 may be configured for monitoring network load over time and determining proportions of the network load attributed to services including VoLTE, VoNR, and data transmission. The resource monitoring and optimization system 200 may further monitor to the proportions of network load attributed to these services based on cell size, location, and network load. Based on the monitoring, the resource monitoring and optimization system 200 may dynamically allocate resources and balance load in order to optimize network performance. To perform the monitoring, balancing, and allocation, the resource monitoring and optimization system 200 may include a processing system 205. Processing system 205 may include a processor 210 and a storage device 215. Storage device 215 may include a disk drive, a flash drive, a memory, or other storage device configured to store data and/or computer readable instructions or codes (e.g., software). The computer executable instructions or codes may be accessed and executed by processor 210 to perform various methods disclosed herein. Software stored in storage device 215 may include computer programs, firmware, or other form of machine-readable instructions, including an operating system, utilities, drivers, network interfaces, applications, or other type of software. For example, software stored in storage device 215 may include a module for performing various operations described herein. For example, resource monitoring logic 230 may include instructions to monitor and analyze proportions of network resources consumed by the services including VoNR, VoLTE, and data transmission. Further, resource optimization logic 235 can include instructions to reallocate resources dynamically based on the monitoring. Processor 210 may be a microprocessor and may include hardware circuitry and/or embedded codes configured to retrieve and execute software stored in storage device 215.

The disclosed resource monitoring and optimization system 200 thus performs RAN resource management, which is the process of allocating and controlling the radio resources, such as frequency, power, and time, among the user devices and the base stations. The resource monitoring and optimization system 200 aims to maximize the network efficiency, quality, and reliability, while minimizing the interference and congestion. RAN resource management can be performed at different levels, such as cell level, cluster level, or network level. The resource monitoring and optimization system 200 may utilize techniques such as admission control, power control, handover control, load balancing, and interference coordination. The resource monitoring and optimization system 200 may further perform RAN resource coordination by harmonizing and synchronizing the radio resources across different network layers and domains to enhance the network performance, capacity, and coverage. The resource monitoring and optimization system 200 may utilize techniques such as carrier aggregation, multi-connectivity, network slicing, and network function virtualization.

The resource monitoring and optimization system 200 may include a communication interface 220 and a user interface 225. Communication interface 220 may be configured to enable the processing system 205 to communicate with other components, nodes, or devices in the wireless network. For example, resource monitoring and optimization system 200 can share intelligence including the resource allocation instructions with access nodes 110, 120.

Communication interface 220 may include hardware components, such as network communication ports, devices, routers, wires, antenna, transceivers, etc. User interface 225 may be configured to allow a user to provide input to the resource monitoring and optimization system 200 and receive data or information from the resource monitoring and optimization system 200. User interface 225 may include hardware components, such as touch screens, buttons, displays, speakers, etc. The resource monitoring and optimization system 200 may further include other components such as a power management unit, a control interface unit, etc.

The resource monitoring and optimization system 200 thus may utilize the memory 215 and the processor 210 to perform multiple operations. For example, the processor 210 may access stored instructions in the memory 215 to monitor resource consumption for VoNR, VoLTE and data transmission services over time and further may access instructions for resource reallocation based on the monitoring.

Furthermore, resource monitoring and optimization system 200 may utilize artificial intelligence (AI) to automatically perform monitoring and characterize the monitoring in accordance with historical patterns. For example, the processor 210 of the resource monitoring and optimization system 200 may train and implement a model incorporating performance measurements over time correlated with use of the services toto facilitate automatic reallocation of resources.

The location of the resource monitoring and optimization system 200 may depend upon the network architecture. For example, in smaller networks, a single resource monitoring and optimization system 200 may be disposed for communication with access nodes 110, 120 and RAN 170. However, in a larger network, multiple resource monitoring and optimization system 200 may be required to cover the network. Further, the functions of the resource monitoring and optimization system 200 may be split between the core networks 102, 103 and the RAN 170.

Figure 3:
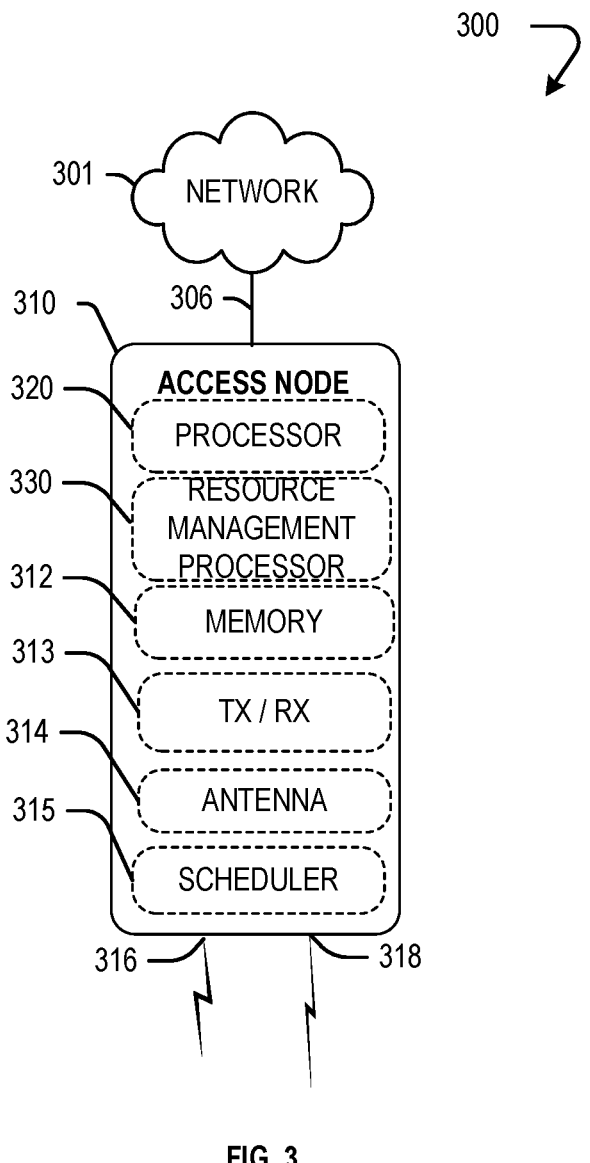
FIG. 3 illustrates an exemplary configuration for an access node in accordance with disclosed embodiments.

FIG. 3 illustrates an operating environment 300 for an exemplary access node 310 in accordance with the disclosed embodiments. In exemplary embodiments, the access node 310 is able to interact effectively with the resource monitoring and optimization system 200 to facilitate monitoring and optimization. The access node 310 can include, for example, a gNodeB or an eNodeB. In specific embodiments provided herein, in which the service is VoNR, the access node 310 is a gNB, whereas VoLTE service may be provided by an eNB. Access node 310 may comprise, for example, a macro-cell access node, such as access nodes 110, 120 described with reference to FIG. 1. Access node 310 is illustrated as comprising a processor 320, an resource management processor 330, a memory 312, transceiver(s) 313, and antenna(s) 314. Processor 320 executes instructions stored on memory 312, while transceiver(s) 313 and antenna(s) 314 enable wireless communication with other network nodes, such as wireless devices and other nodes. For example, wireless devices may initiate uplink transmissions such that the transceivers 313 and antennas 314 receive messages including, for example, instructions from the resource monitoring and optimization system 200, for example, over communication links 316 and 418. The transceivers 313 and antennas 314 may further pass the messages to a mobility entity in the core network. Further, the transceivers 313 and antennas 314 receive signals from the mobility entity such as a mobility management entity (MME) or access and mobility function (AMF) and pass the messages to the appropriate wireless device. Scheduler 315 may be provided for scheduling resources based on the instructions received and processed at a resource management processor 330. Network 301 may be similar to the network 101 discussed above with respect to FIG. 1.

In embodiments provided herein, the processor 320 may operate in conjunction with scheduler 315 and resource management processor 330 to perform resource management in accordance with network load based on historical patterns. In operation, the resource management processor 330 may be integrated with the processor 320 or alternatively may comprise logic stored in the memory 312 to execute resource management procedures. For example, the resource management processor 330 may receive instructions from the resource monitoring and optimization system 200 and may provide the received instructions to components of the access node such as the scheduler 315 for scheduling resource blocks for the different services such VoNR, VoLTE and data transmission and antennas and transmitters for adjusting transmit power.

While the processor 320, the resource management processor 330, and the scheduler 315 are shown as separate components, these components may optionally be integrated in various combinations. For example, the processor 320 may perform the functions described above with respect to the resource management processor 330 by accessing stored instructions from the memory 312. Further, the memory 312 may store service specific information, such as VoNR quality of service (QoS) requirements, timers for connectivity, and thresholds for handing over. The QoS for VoNR may require, for example, that VoNR be provided without service gaps or interruptions.

The access node 310 may utilize transceivers 313 and antennas 314 to communicate information, for example with the wireless devices 122, 124, and with the core networks 102, 103. For example, these components may receive requests from the wireless devices 122, 124 and further may receive instructions, such as policies, from the core network 102, 103 and the resource monitoring and optimization system 200. For example, the access node 310 may report network events, outages, or overloading to the resource monitoring and optimization system 200. Such events could change the decisions being made at the resource management and optimization system 200. For example, if an access node 310 is overloaded with VoLTE traffic, the resource monitoring and optimization system 200 upon receiving this notification, may not allow handovers to the access node 310.

Figure 4:
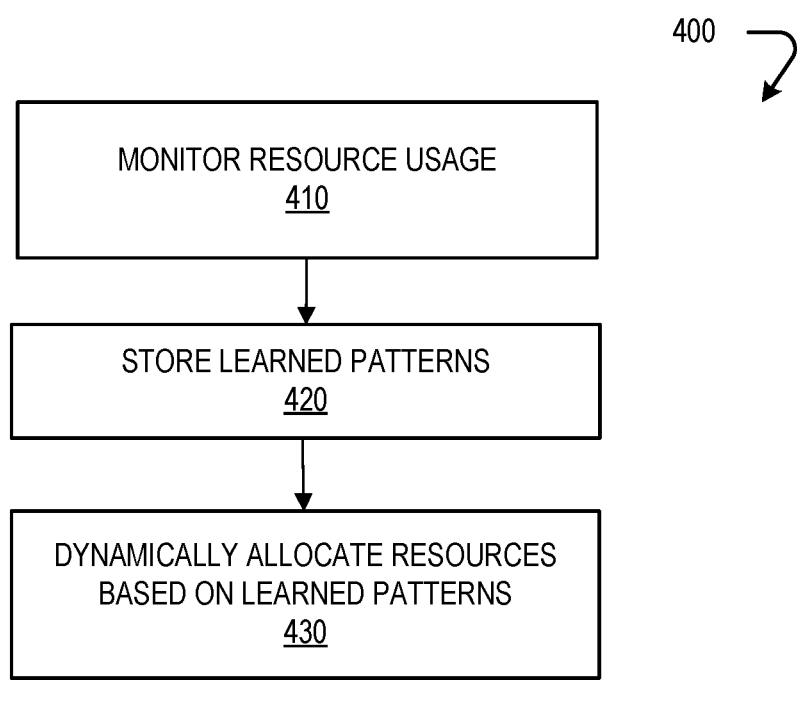
FIG. 4 depicts an exemplary method for monitoring and reallocating resources in accordance with disclosed embodiments.

The disclosed methods for resource monitoring and optimization are discussed further below. FIG. 4 illustrates an exemplary method 400 for utilizing resource monitoring to optimize resources and balance load based on historical patterns. Method 400 may be performed by any suitable processor discussed herein, for example, a processor 210 included in the resource monitoring and optimization system 200. For discussion purposes, as an example, method 400 is described as being performed by the processor 210 of the resource monitoring and optimization system 200.

Method 400 begins in step 410, when the resource management and optimization system 200 monitors network load over time. For example, the processor 210 may monitor the use of VoLTE, VoNR, and data transmission within the network. The monitoring may occur for an entire network or a portion of the network and may be conducted by one or more resource management and optimization systems 200. The monitoring may occur at the access nodes 110, 120. For example, the processor 210 may monitor the portion of resources allotted to VoLTE and the eNB 110 and the portion of resources allotted to VoNR and the gNB 220. Further, the processor 210 may consider the cell size, cell location, and total cell load during the monitoring. For example, heavily loaded cells may have different proportions of resources consumed by voice and data than lightly loaded cells. Thus, evaluating cell loading conditions may be based on a number of wireless devices connected to a cell. Alternatively, evaluating cell loading conditions may be based on a number of resource blocks consumed by each service during a particular time period. Larger cells may be characterized by having different proportions of resources consumed for voice and data than smaller cells. Cell size may be evaluated, for example, based on a coverage area of the cell. Further, where many wireless devices utilize a particular service, such as VoNR, at a cell edge, a larger proportion of resources may be consumed for voice services than for data services in that cell. Thus, monitoring resource usage may include evaluating wireless device location based on proximity to a cell edge.

In step 420, the resource management and optimization system 200 stores learned patterns based on the monitoring. The patterns may be stored for particular cells over a time period. For example, the monitoring may define peak hours, such as daytime hours of 9 AM to 5 PM, or may utilize shorter intervals, such as 10 AM to noon, or 2 PM to 4 PM. Different patterns may be stored for night-time hours and weekends. For example, more voice service may be used during night-time or off-peak hours than data service. Thus, the resource monitoring and optimization system 200 may store resource usage profiles for each cell or for a collection of cells.

Further, in step 430, the resource monitoring and optimization system 200 dynamically allocates resources over time, based on learned resource usage patterns for the various services provided by the access nodes 110, 120. Thus, the resource monitoring and optimization system 200 analyzes the stored patterns in order dynamically allocated resources in step 430. By continuously monitoring, storing, and analyzing in steps 410, 420, and 430, the resource monitoring and optimization system 200 is able to build and refine a load balancing plan in step 430. Thus, the resource monitoring and optimization system 200 builds network intelligence based on historical trends and utilizes this intelligence for resource allocation and load balancing. In embodiments set forth herein, in order to allocate resources, the resource monitoring and optimization system 200 further informs access nodes 110, 120 regarding new directives pertaining to resource block allocations, admission control, antenna adjustments, or handover plans.

Figure 5:
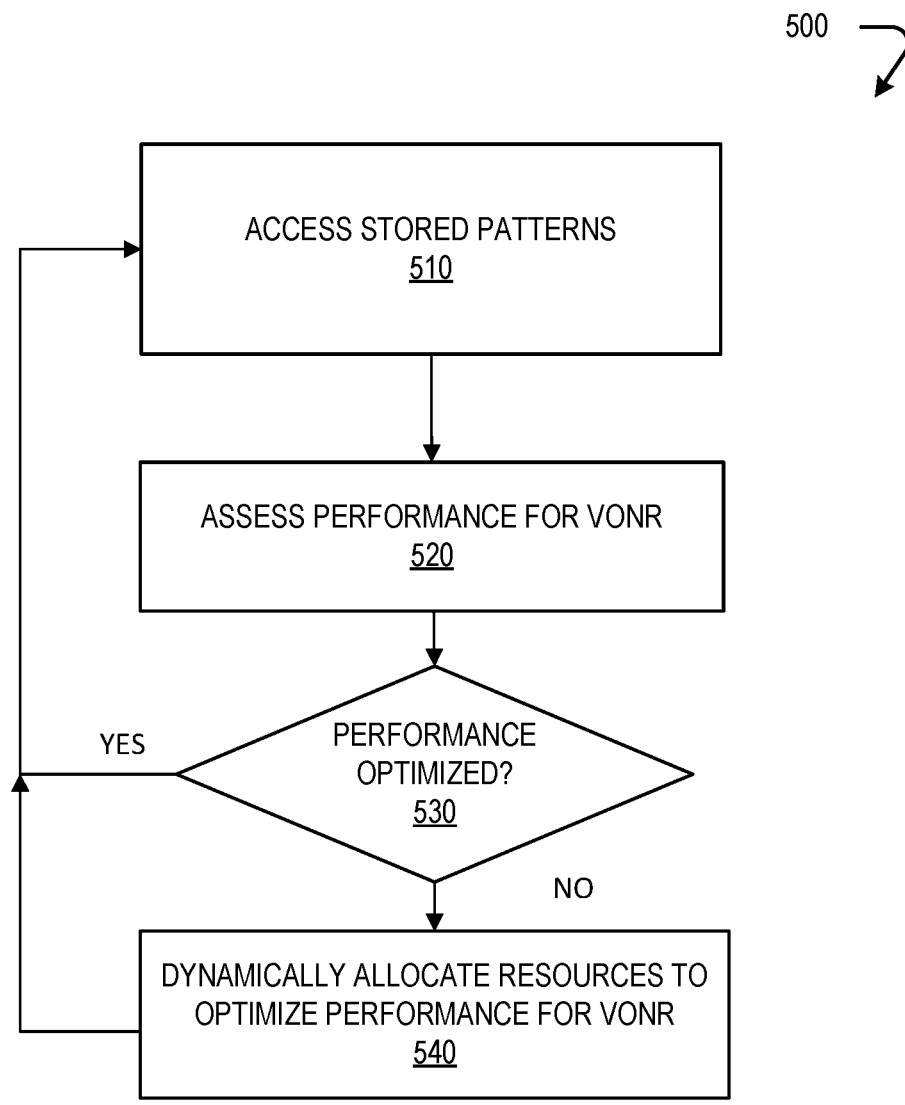
FIG. 5 depicts a further exemplary method for resource allocation in order to optimize VoNR in accordance with disclosed embodiments.

FIG. 5 illustrates further details of resource optimization and load balancing in accordance with embodiments set forth herein. In particular, FIG. 5 illustrates resource optimization and load balancing based on the monitoring described herein. Method 500 may be performed by any suitable processor discussed herein, for example, a processor 210 included in the resource monitoring and optimization system 200. For discussion purposes, as an example, method 500 is described as being performed by the processor 210.

In step 510, the processor 210 accesses stored patterns. The stored patterns may be stored as set forth above with respect to FIG. 4, based on monitoring of network resource usage over time. For example, the stored patterns may reflect portions of network resources utilized for VoNR, VoLTE, and data transmission over time. The stored patterns may be specific to various types of cells and locations within a cell.

In step 510, the processor 210 of the resource monitoring and optimization system 200 may assess performance for VoNR. The performance may be assessed by reporting from one or more access nodes 120 in communication with wireless devices 124. The access nodes 120 may report, for example, on the QoS delivered to the wireless devices 124.

In step 530, the processor 210 may determine if performance is optimized for VoNR. For example, the processor 210 may determine if the QoS delivered to the wireless devices 124 is sufficient based on stored parameters and thresholds within the network. If the performance is sufficient, the processor 210 may continue to access stored patterns and assess VoNR performance. However, if the performance is deemed insufficient in step 530, the processor 210 may dynamically allocate resources to optimize performance for VoNR in step 540. Various scenarios for reallocating resources and improving VoNR performance are within scope of the disclosure. Resources may be reallocated, for example, through transmission of instructions from the resource monitoring and optimization system 200 to the access nodes 110, 120.

Figure 6:
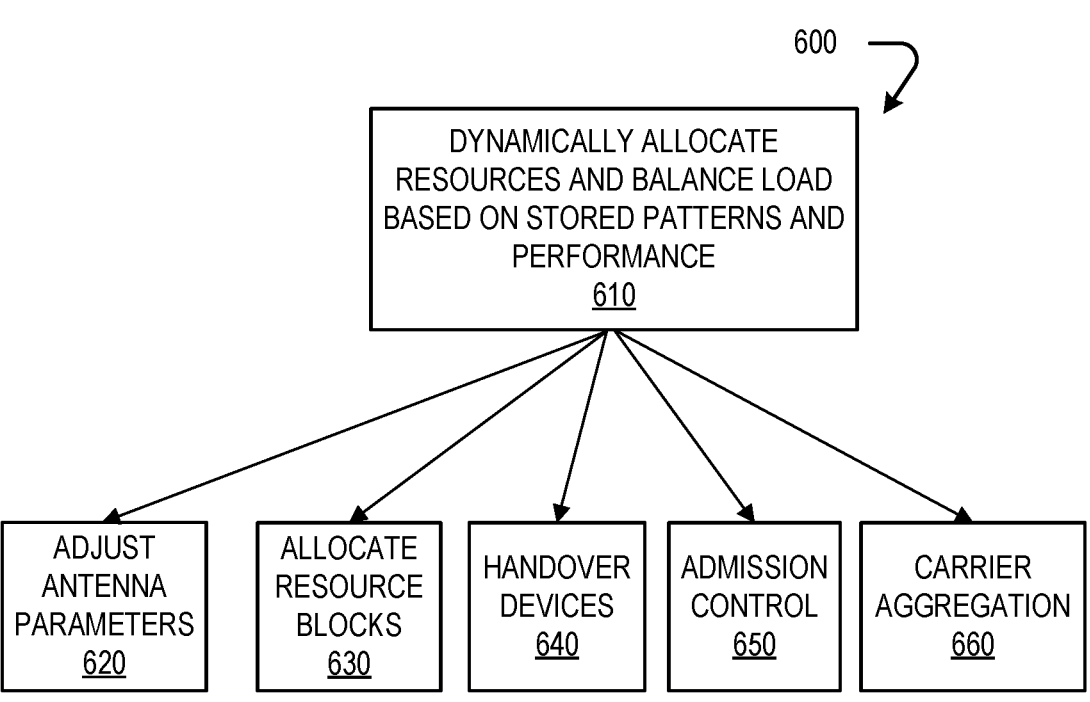
FIG. 6 depicts an exemplary method for resource reallocation in accordance with disclosed embodiments.

As illustrated in FIGS. 4 and 5, methods may be implemented to detect patterns and make resource allocation decisions based on those patterns. FIG. 6 illustrates a method 600 for allocating resources based on those decisions. The method 600 may be performed by any suitable processor such as, for example, the processor 210 of the resource monitoring and optimization system 200 in combination with the processors 320, 330 of the access node 310.

In step 610, processor 210 dynamically allocates resources and balances load based on the stored performance parameters. Various alternative techniques for allocating the resources may be performed in steps 620, 630, 640, 650, and 660. These techniques may be implemented separately or in combination. Reconfiguration may be accomplished through communication with a wireless device through a radio resource control (RRC) reconfiguration message to wireless devices. The message may be sent, for example, from an access node 110, 120, receiving instructions from the resource monitoring and optimization system 200. For example, in step 610 the processor 210 may cause the processor 320 to adjust antenna parameters. Parameters that may be adjusted include, for example, antenna tilt, and transmission power. In step 630, the processor 210 or other processor may reallocate resource blocks dedicated to services including VoNR, VoLTE, and data transmissions. Further, in step 640, the processor 210 may cause devices to be handed over from one access node to another or from one service to another. For example, devices may be handed over from VoNR to VoLTE. This may occur, for example, for devices in specific locations within a network. For example, devices within a predetermined distance from a cell edge or coverage boundary may be subject to handover. As a further example, the processor 210 may reallocate resources in step 650 by performing admission control. Admission control may dictate how many devices can be admitted to a particular service such as VoNR, VoLTE, or data transmission. When a particular threshold is reached, the processor 210 may dictate that no new devices can be admitted for that particular service. Thus, reallocating network resources may include setting a threshold number of wireless devices permitted to connect to the network using VoNR or as a further example, setting a threshold number of wireless devices permitted to connect from a cell edge or coverage boundary location using VoNR. As yet a further example, in step 660, the processor 210 may configure resources so that wireless devices 122, 124 participate in carrier aggregation. For example, wireless devices 122, 124, may utilize two different RATs to perform different services, such as VoNR, VoLTE, and data transmission. As explained herein, all of these methods may be performed over multiple time periods. These methods for allocating resources are merely exemplary and are not intended to be limiting.

In some embodiments, methods 400, 500, and 600 may include additional steps or operations. Furthermore, the methods may include steps shown in each of the other methods. As one of ordinary skill in the art would understand, the methods 400, 500, and 600 may be integrated in any useful manner and the steps may be performed in any useful sequence.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not all within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:

monitoring network resource usage by wireless devices within a network based on a time of day, cell loading conditions, wireless device location, and cell size;

determining proportions of network resources utilized by the wireless devices within the network for voice over new radio (VoNR), voice over LTE (VoLTE) and data services during the monitoring; and reallocating the network resources based on the monitored resource usage and the proportions.

2. The method of claim 1, further comprising dynamically reallocating the network resources periodically over multiple time periods.

3. The method of claim 1, wherein reallocating the network resources comprises reallocating resource blocks.

4. The method of claim 1, further comprising evaluating wireless device location based on proximity to a cell edge.

5. The method of claim 1, further comprising evaluating cell loading conditions within a cell based on a number of wireless devices connected to the cell.

6. The method of claim 1, further comprising evaluating cell loading conditions based on a number of resource blocks consumed during the time of day.

7. The method of claim 1, further comprising evaluating cell size within a cell based on a coverage area of the cell.

8. The method of claim 1, wherein reallocating network resources comprises setting a threshold number of wireless devices permitted to connect to the network using VoNR.

9. The method of claim 1, wherein reallocating network resources comprises setting a threshold number of wireless devices permitted to connect to the network from a cell edge location using VoNR.

10. The method of claim 1, further comprising sending a radio resource control (RRC) reconfiguration message to at least one wireless device upon reallocation of resources.

11. A resource optimization system comprising:

a memory storing instructions; and a processor executing the stored instructions to perform operations including:

monitoring network resource usage by wireless devices within a network based on time of day, cell loading conditions, wireless device location, and cell size;

determining proportions of network resources utilized by the wireless devices within the network for voice over new radio (VoNR), voice over LTE (VoLTE) and data services during the monitoring; and reallocating the network resources based on the monitored resource usage and the proportions.

12. The system of claim 11, the operations further comprising dynamically reallocating the network resources periodically over multiple time periods.

13. The system of claim 11, wherein reallocating the network resources comprises reallocating resource blocks.

14. The system of claim 11, the operations further comprising evaluating wireless device location based on proximity to a cell edge.

15. The system of claim 11, the operations further comprising evaluating cell loading conditions within a cell based on a number of wireless devices connected to the cell.

16. The system of claim 11, the operations further comprising evaluating cell loading conditions based on a number of resource blocks consumed during the time of day.

17. The system of claim 11, the operations further comprising evaluating cell size based on a coverage area of the cell.

18. A non-transitory computer-readable medium storing instructions executed by a processor to perform operations comprising:

monitoring network resource usage by wireless devices within a network based on at least a time of day;

determining proportions of network resources utilized by the wireless devices within the network for voice over new radio (VoNR), voice over LTE (VoLTE) and data services during the monitoring; and reallocating the network resources based on the monitored resource usage and the proportions.

19. The non-transitory computer-readable medium of claim 1, further comprising instructions for monitoring the network resource usage based on cell loading conditions, wireless device location, and cell size.

20. The non-transitory computer-readable medium of claim 1 further comprising dynamically reallocating the network resources periodically over multiple time periods.

\* \* \* \* \*